US011169783B2

(12) United States Patent
Pendharkar et al.

(10) Patent No.: US 11,169,783 B2
(45) Date of Patent: Nov. 9, 2021

(54) SYSTEM AND METHOD FOR GENERATING AN EXECUTABLE HARDWARE-SOFTWARE INTERFACE SPECIFICATION

(71) Applicant: VAYAVYA LABS PRIVATE LIMITED, Bangalore (IN)

(72) Inventors: Sandeep Pendharkar, Bangalore (IN); Parag Naik, Bangalore (IN); Venugopal Kolathur, Bangalore (IN); Karthick Gururaj, Bangalore (IN)

(73) Assignee: VAYAVYA LABS PRIVATE LIMITED, Bangalore (IN)

( * ) Notice: Subject to any disclaimer, the term of this patent is extended or adjusted under 35 U.S.C. 154(b) by 0 days.

(21) Appl. No.: 16/783,017

(22) Filed: Feb. 5, 2020

(65) Prior Publication Data

US 2020/0249913 A1  Aug. 6, 2020

(30) Foreign Application Priority Data

Feb. 5, 2019  (IN) .............................. 201941004532

(51) Int. Cl.
*G06F 8/10* (2018.01)
*G06F 9/54* (2006.01)
*G06F 8/41* (2018.01)
*G06F 9/4401* (2018.01)

(52) U.S. Cl.
CPC ................ *G06F 8/10* (2013.01); *G06F 8/427* (2013.01); *G06F 9/4411* (2013.01); *G06F 9/54* (2013.01)

(58) Field of Classification Search
CPC ... G06F 8/10; G06F 9/54; G06F 8/427; G06F 9/4411; G06F 9/541; G06F 8/30
See application file for complete search history.

(56) References Cited

U.S. PATENT DOCUMENTS

| | | | | |
|---|---|---|---|---|
| 6,980,941 | B2 * | 12/2005 | Iwamasa | G06F 8/10 703/13 |
| 8,677,310 | B2 * | 3/2014 | Weatherhead | G06F 8/10 717/102 |
| 8,683,428 | B2 * | 3/2014 | Sliwowicz | G06F 9/4411 717/107 |
| 9,811,319 | B2 * | 11/2017 | Weinsberg | G06F 8/30 |

(Continued)

*Primary Examiner* — Daxin Wu

(57) ABSTRACT

A method for operating a hardware-software interface (HSI) executable specification unit by means of an executable hardware-software interface (HSI) specification for a computing device is provided. The executable HSI specification is a form of a Device Programming Specification (DPS). The HSI executable specification unit includes a HSI analyser, at least one skeletal driver and a HSI executable specification interpreter. The method includes (i) capturing at least one HSI for generating the executable HSI specification, (ii) analyzing at least one section of the DPS to determine sequences that are required for executing the executable HSI specification, (iii) parsing, using the HSI analyzer, the DPS into an intermediate form, (iv) verifying if an intermediate representation (IR) for each of the sequences to be invoked in at least one skeletal driver Application Programming Interface (API) is present and (v) translating the sequences of the DPS into at least one hardware-software interface (HSI) intermediate representation (IR).

19 Claims, 9 Drawing Sheets

(56) References Cited

U.S. PATENT DOCUMENTS

| | | | |
|---|---|---|---|
| 2003/0229685 A1* | 12/2003 | Twidale | G06F 9/46 709/220 |
| 2005/0289485 A1* | 12/2005 | Willis | G06F 30/30 716/104 |
| 2008/0155572 A1* | 6/2008 | Kolathur | G06F 8/30 719/327 |
| 2014/0196004 A1* | 7/2014 | Weinsberg | G06F 8/30 717/106 |
| 2018/0246752 A1* | 8/2018 | Bonetta | G06F 16/20 |

* cited by examiner

SYSTEM AND METHOD FOR GENERATING AN EXECUTABLE HARDWARE-SOFTWARE INTERFACE SPECIFICATION

CROSS-REFERENCE TO RELATED APPLICATIONS

This patent application claims priority to Indian provisional patent application no. 201941004532 filed on Feb. 5, 2019, the complete disclosures of which, in their entireties, are hereby incorporated by reference.

BACKGROUND

Technical Field

The embodiments herein generally relate to an executable specification of hardware software interface of a device captured in one or more domain specific languages, and, more particularly, enabling the hardware-software interface of the device captured in a DSL (domain specific language) to be directly used as an executable specification.

Description of the Related Art

In computation, a computer program is typically needed to operate or control all the devices attached to a computer. Device driver software is a computer program, which communicates with the device through the computer bus or communications subsystem to which the hardware connects. An engineer is typically required to generate device driver software for a given hardware device. The device driver software could be manually created by understanding the programming guide of the device. More recently, if the device specification also known as Hardware Software Interface (HSI) is captured in one or multiple types of a Domain Specific Language (DSL), then code generator tools can automatically generate the device driver software. This device driver software is typically in a programming language like C. The programmer further compiles and links this code with other operating system software modules (colloquially referred to as the software stack).

Thus, the engineer needs to generate the driver code either manually or using some code generator tool and separately compile and link it. Accordingly, there remains a need for a system that reduces the manual work and directly executes the hardware-software interface specification.

SUMMARY

In view of the foregoing, embodiments herein provide a method for operating a hardware-software interface (HSI) executable specification unit by means of an executable hardware-software interface (HSI) specification for a computing device. The executable hardware-software interface (HSI) specification is a form of a Device Programming Specification (DPS). The hardware-software interface (HSI) executable specification unit includes a hardware-software interface (HSI) analyser, at least one skeletal driver and a hardware-software interface (HSI) executable specification interpreter. The method includes (i) capturing at least one hardware-software interface (HSI) for generating the executable hardware-software interface (HSI) specification, (ii) analyzing at least one section of the device programming specification (DPS) to determine one or more sequences that are required for executing the executable hardware-software interface (HSI) specification, (iii) parsing, using the hardware-software interface (HSI) analyzer, the device programming specification (DPS) into an intermediate form, (iv) verifying if an intermediate representation (IR) for each of the one or more sequences to be invoked in at least one skeletal driver Application Programming Interface (API) is present in the device programming specification (DPS), (v) translating, using the HSI analyzer, the one or more sequences of the device programming specification (DPS) into at least one hardware-software interface (HSI) intermediate representation (IR) if each sequence is present in the device programming specification (DPS), (vi) analyzing, using the HSI analyzer, a runtime execution and software architecture details of a runtime specification (RTS) to generate a mapping between the at least one skeletal driver Application Programming Interface (API) and hardware-software interface (HSI) sequences and (vii) interpreting the at least one the hardware-software interface (HSI) intermediate representation (IR) for performing at least one action on the computing device.

In some embodiments, the at least one hardware-software interface (HSI) intermediate representation (IR) is interpreted for performing the at least one action on the computing device to execute the at least one skeletal driver API based on a request that is received from at least one of (i) an application, (ii) a protocol or (iii) a middleware.

In some embodiments, the method includes parsing, using the hardware-software interface (HSI) analyzer, a Runtime Specification (RTS) file if a parse error is not generated in the device programming specification (DPS).

In some embodiments, the intermediate representation (IR) for each of the one or more sequences to be invoked in the at least one skeletal driver API is determined based on an operating system and an environment input.

In some embodiments, the mapping enables the HSI executable specification interpreter to (i) identify the hardware-software interface (HSI) sequences to be loaded for an interpretation and (ii) pre-load an intermediate representation (IR) for the corresponding HSI sequences for the interpretation when the at least one skeletal driver API of the computing device is executed.

In some embodiments, the method includes (i) executing a hardware-software interface (HSI) load function from the hardware-software interface (HSI) executable specification interpreter to load intermediate representations (IRs) for the one or more sequences that need to be interpreted during an execution of the at least one skeletal driver API and (ii) calling a hardware-software interface (HSI) interpret function from the HSI executable specification interpreter to interpret a corresponding sequence that is required by the at least one skeletal driver API.

In some embodiments, the at least one skeletal driver calls the hardware-software interface (HSI) interpret function along with a name of the corresponding sequence as argument to inform the HSI interpreter about the corresponding sequence that to be interpreted.

In some embodiments, the method includes invoking the HSI executable specification interpreter at an appropriate point and specifying a device programming specification (DPS) sequence that needs to be interpreted during execution of the at least one skeletal driver API.

In some embodiments, the method includes interpreting, using the HSI executable specification interpreter, the DPS sequence using the corresponding IR that was created previously by the HSI analyzer.

In some embodiments, the at least one hardware-software interface (HSI) intermediate representation (IR) is at least one of (i) a byte code and (ii) a Abstract Syntax Tree (AST).

In one aspect, a system for operating a hardware-software interface (HSI) executable specification unit by means of an executable hardware-software interface (HSI) specification for a computing device is provided. The executable hardware-software interface (HSI) specification is a form of a Device Programming Specification (DPS). The system includes one or more processors and one or more non-transitory computer-readable mediums storing one or more sequences of instructions, which when executed by the one or more processors. The hardware-software interface (HSI) executable specification unit includes a hardware-software interface (HSI) analyzer, at least one skeletal driver and a hardware-software interface (HSI) executable specification interpreter. The one or more processors cause (i) capturing at least one hardware-software interface (HSI) for generating the executable hardware-software interface (HSI) specification, (ii) analyzing at least one section of the device programming specification (DPS) to determine one or more sequences that are required for executing the executable hardware-software interface (HSI) specification, (iii) parsing, using the hardware-software interface (HSI) analyzer, the device programming specification (DPS) into an intermediate form, (iv) verifying if an intermediate representation (IR) for each of the one or more sequences to be invoked in at least one skeletal driver Application Programming Interface (API) is present in the device programming specification (DPS), (v) translating, using the HSI analyzer, the one or more sequences of the device programming specification (DPS) into at least one hardware-software interface (HSI) intermediate representation (IR) if each sequence is present in the device programming specification (DPS), (vi) analyzing, using the HSI analyzer, a runtime execution and software architecture details of a runtime specification (RTS) to generate a mapping between the at least one skeletal driver Application Programming Interface (API) and hardware-software interface (HSI) sequences and (vii) interpreting the at least one hardware-software interface (HSI) intermediate representation (IR) for performing the at least one action on the computing device.

In some embodiments, the at least one hardware-software interface (HSI) intermediate representation (IR) is interpreted for performing the at least one action on the computing device to execute the at least one skeletal driver API based on a request that is received from at least one of (i) an application, (ii) a protocol or (iii) a middleware.

In some embodiments, the method includes parsing, using the hardware-software interface (HSI) analyzer, a Runtime Specification (RTS) file if a parse error is not generated in the device programming specification (DPS).

In some embodiments, the intermediate representation (IR) for each of the one or more sequences to be invoked in the at least one skeletal driver API is determined based on an operating system and an environment input.

In some embodiments, the mapping enables the HSI executable specification interpreter to (i) identify the hardware-software interface (HSI) sequences to be loaded for an interpretation and (ii) pre-load an intermediate representation (IR) for the corresponding HSI sequences for the interpretation when the at least one skeletal driver Application Programming Interface (API) of the computing device is executed.

In some embodiments, the one or more processors further cause (i) executing a hardware-software interface (HSI) load function from the hardware-software interface (HSI) executable specification interpreter to load intermediate representations (IRs) for the one or more sequences that need to be interpreted during an execution of the at least one skeletal driver API and (ii) calling a hardware-software interface (HSI) interpret function from the HSI executable specification interpreter to interpret a corresponding sequence that is required by the at least one skeletal driver API.

In some embodiments, the at least one skeletal driver calls the hardware-software interface (HSI) interpret function along with a name of the corresponding sequence as argument to inform the HSI interpreter about the corresponding sequence that is to be interpreted.

In some embodiments, the one or more processors further cause invoking the HSI executable specification interpreter at an appropriate point and specifying a device programming specification (DPS) sequence that needs to be interpreted during execution of the at least one skeletal driver API.

In some embodiments, the one or more processors further cause interpreting, using the HSI executable specification interpreter, the DPS sequence using the corresponding IR that was created previously by the HSI analyzer.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
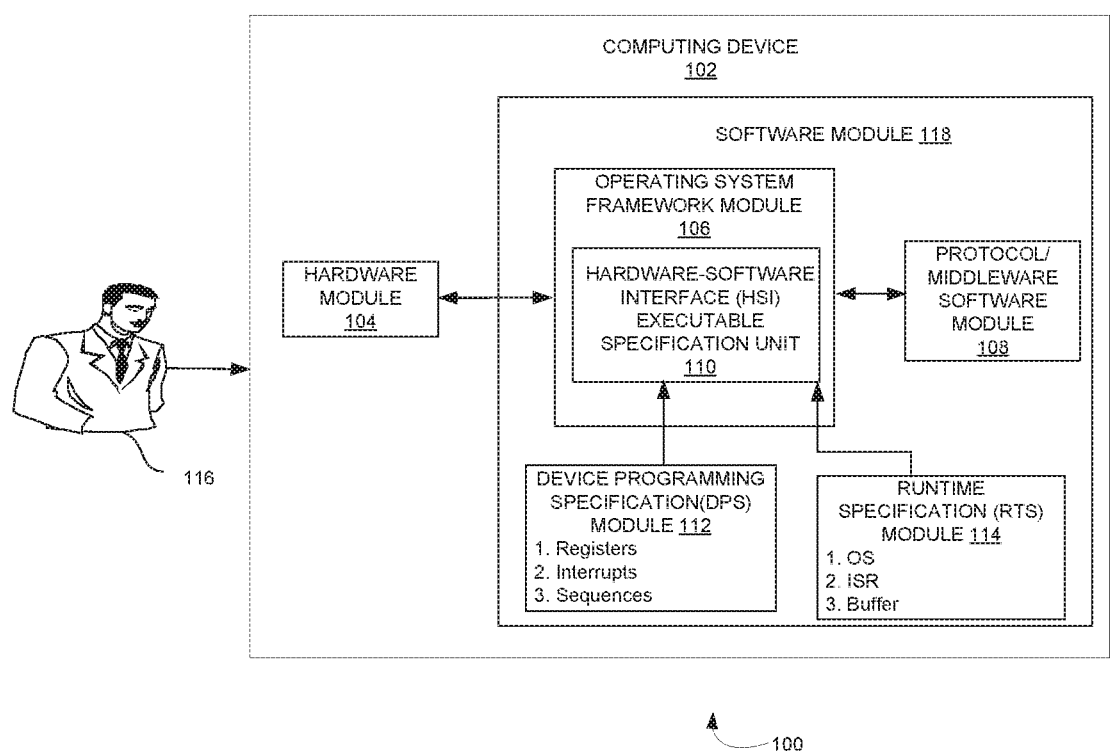
FIG. 1 is a block diagram of generating an executable hardware-software interface specification according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need of a system which reduces the manual work and directly executes the hardware-software interface specification. The embodiments herein achieve this by providing the executable hardware-software interface module that enables the interaction between the protocol/middleware software and the underlying hardware without generating and compiling the driver code. Referring now to the drawings, and more particularly to FIGS. 1 through 9, where similar reference characters denote corresponding features consistently throughout the figures, there are shown preferred embodiments.

FIG. 1 is a block diagram 100 of generating an executable hardware-software interface specification according to some embodiments herein. The block diagram 100 includes a computing device 102 and a user 116. The computing device 102 includes a hardware module 104 and a software module 118. The software module 118 further includes an operating system framework module 106, a protocol/middleware software module 108, a hardware-software interface (HSI) executable specification unit 110, a Device Programming Specification (DPS) module 112 and a Runtime Specification (RTS) module 114. The operating system framework module 106 manages computer hardware and software resources and provides common services to at least one of (i) computer programs and (ii) one or more applications stored and run by the hardware module 104. In some embodiments, the protocol/middleware software module 108 provides communications, input/output and other services to software applications beyond those which are available from an operating system in the software module 118. The hardware-software interface (HSI) executable specification unit 110 directly interprets hardware-software interface (HSI) specification thus ensuring that software stack is able to interact and work with an underlying device or the hardware module 104 without generating an explicit 'device driver code'.

The Device Programming Specification (DPS) module 112 captures hardware-software interface (HSI) of the particular hardware device for generating an executable hardware-software interface (HIS) specification. In some embodiments, the hardware-software interface (HSI) executable specification unit 110 directly operates with the Device Programming Specification (DPS) module 112 without generating a driver code from Device Programming Specification (DPS). In some embodiments, the Device Programming Specification (DPS) module 112 is operated as an executable specification. The hardware-software interface (HSI) executable specification unit 110 translates the hardware software interface (HSI) specification in the Device Programming Specification (DPS) module 112 into byte code or any other suitable intermediate representation (IR). The hardware-software interface (HSI) executable specification unit 110 interprets sections of the byte code and performs the necessary action on the computing device 102, required for any interaction by the protocol/middleware software module 108 with the underlying device or the hardware module 104.

Figure 2:
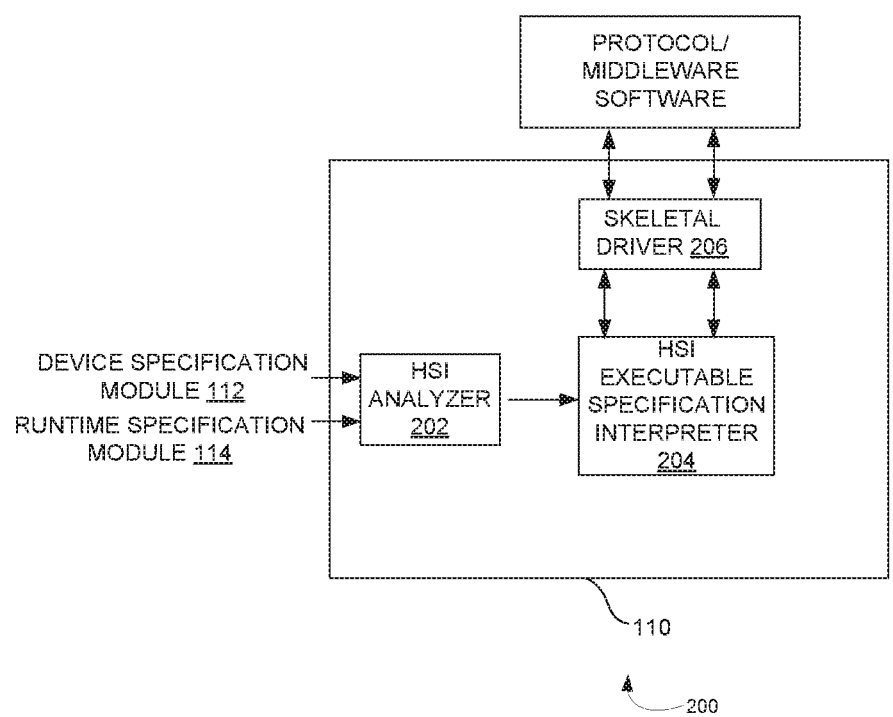
FIG. 2 is a block diagram of an executable hardware-software interface specification unit of FIG. 1 according to some embodiments herein.

FIG. 2 is a block diagram 200 the hardware-software interface (HSI) specification unit 110 of FIG. 1 according to some embodiments herein. The hardware-software interface specification unit 110 includes a hardware-software interface (HSI) Analyzer 202, a hardware-software interface (HSI) executable specification interpreter 204 and a skeletal driver 206. The hardware-software interface (HSI) analyzer 202 analyses a device programming specification (DPS) input file and determines whether one or more sequences required for an execution of the skeletal driver 206 are present in the device programming specification (DPS). The HSI analyzer 202 parses the device programming specification (DPS) and translates the DPS into an Intermediate form. In some embodiments, this intermediate representation (HSI IR) may exist in multiple forms such as a byte code for Virtual Machine based interpretation or even an Abstract Syntax Tree (AST) where interpretation may be in the form of symbolic execution.

The HSI analyzer 202 analyzing the runtime execution and software architecture details provided in Runtime Specification (RTS) to generate a mapping between skeletal driver Application Programming Interfaces (APIs) and HSI sequences. In some embodiments, the mapping essentially enables the HSI interpreter 204 to pre-load the intermediate representation (IR) for appropriate HSI sequences for interpretation when a particular driver API gets executed to service certain request from an application/protocol software or a middleware. The HSI analyzer 202 parses a device programming specification (DPS) input file and verifies whether an intermediate representation (IR) for each of the one or more sequences to be invoked in a corresponding driver Application Programming Interface (API) is present. In some embodiments, the HSI analyzer 202 errors out if any of the sequences are not present. The HSI analyzer 202 translates the DPS sequences into HSI intermediate representation. The HSI analyzer 202 further creates a map that identifies the HSI sequences that need to be interpreted during the execution of the corresponding driver Application Programming Interface (API).

The hardware-software interface (HSI) executable specification interpreter 204 preloads the intermediate representation (IR), when the driver Application Programming Interface (API) is executed. In some embodiments, the driver Application Programming Interface (API) is executed on the request received from the protocol/middleware software module 108. The hardware-software interface (HSI) executable specification interpreter 204 identifies the hardware-software interface (HSI) sequences that need to be loaded for interpretation using the map that is created by the HSI analyzer 202. In some embodiments, a driver code invokes hardware-software interface (HSI) executable specification interpreter 204 at the appropriate point and specifies the Device Programming Specification (DPS) sequence that has to be interpreted during an execution of the corresponding driver Application Programming Interfaces (API). In some embodiments, the hardware-software interface (HSI) executable specification interpreter 204 interprets the sequence using the corresponding IR that was created previously by the HSI Analyzer 202. In some embodiments, an execution flow is transferred back to the skeletal driver 206 at the end of the interpretation.

In some embodiments, the skeletal driver 206 includes one or more codes concerned with an interaction of the application/protocol/middleware, book keeping, data management, etc. In some embodiments, the skeletal driver 206 does not contain any code related to interaction with an underlying device or the hardware module 104. In some embodiments, the skeletal driver 206 relies on the hardware-software interface (HSI) executable specification interpreter 204 for interacting with the computing device 102. In some embodiments, the hardware-software interface (HSI) executable specification interpreter 204 operates along with the skeletal driver 206.

Figure 3:
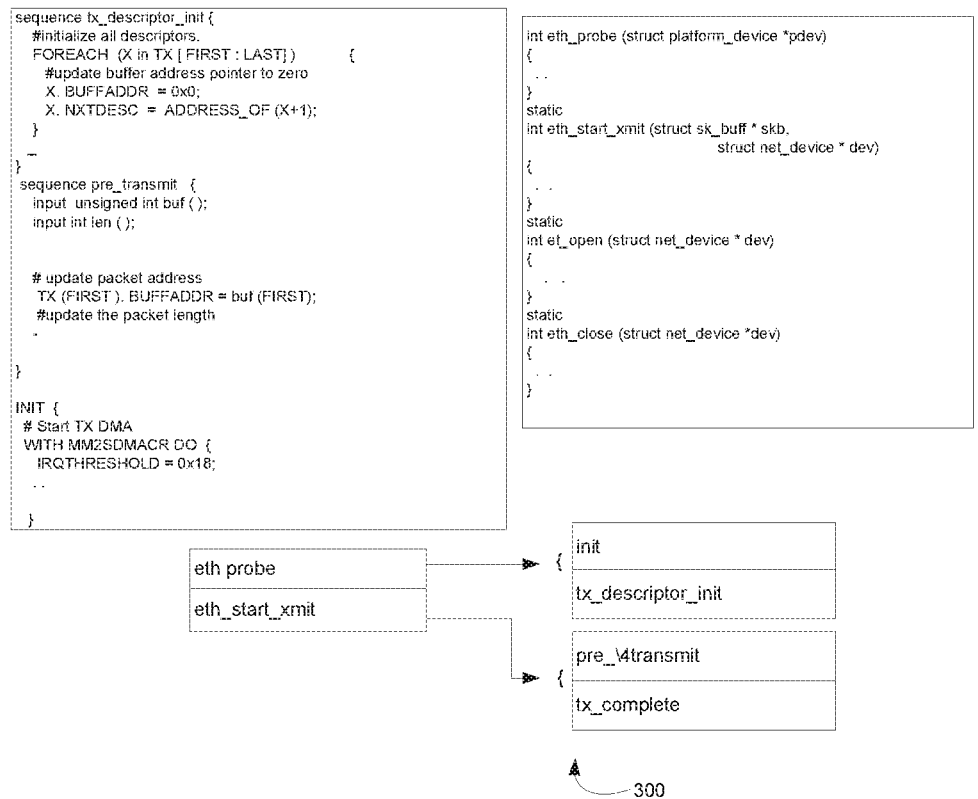
FIG. 3 illustrates a mapping between skeletal device driver's Application Programming Interfaces (APIs) and hardware-software interface (HSI) sequences according to some embodiments herein.

FIG. 3 illustrates a mapping 300 between skeletal driver's Application Programming Interfaces (APIs) and hardware-software interface (HSI) sequences according to some embodiment herein. In some embodiments, tx_descriptor_init initializes and sets a linked list of one or more descriptors that are required for a transmit operation. The pre_transmit sequence programs the fields of each individual descriptor. As shown in the FIG. 3, the address of each input buffer is copied in the corresponding descriptor field. The INIT sequence initializes at least one device register field and values. In some embodiments, typical APIs in the skeletal driver 206 for a Linux operating system are shown in FIG. 3. The mapping shows the API of the skeletal driver 206 and corresponding DPS sequences that need to be interpreted during execution of the skeletal driver 206. Thus, the INIT and tx_descriptor_init sequences need to be interpreted when the eth_probe API in the skeletal driver 206 is executed. Similarly, pre_transmit and tx_complete DPS sequences during execution of the eth_start_transmit API.

Figure 4:
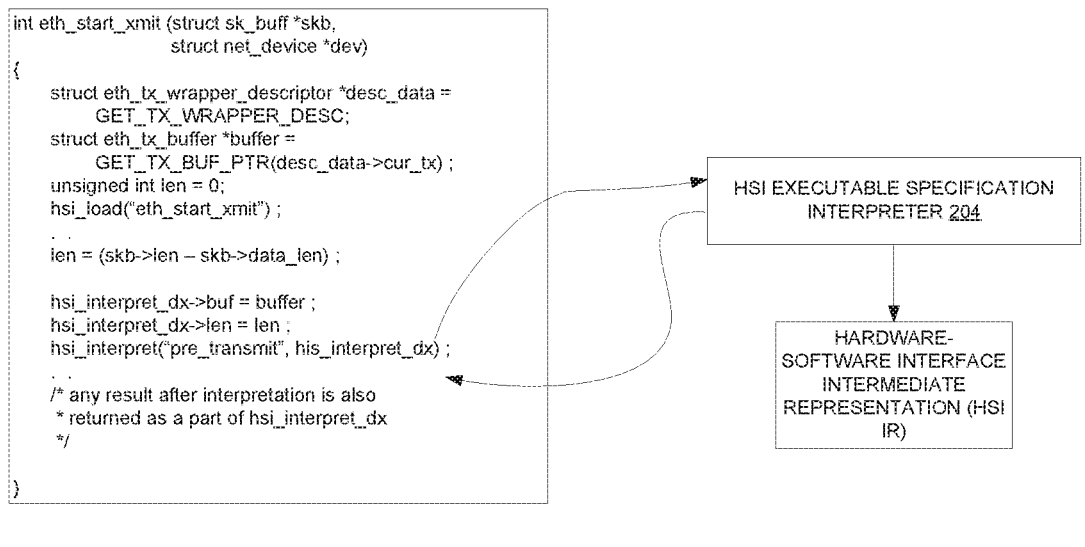
FIG. 4 illustrates a snippet of a skeletal driver code for an ethernet controller device according to some embodiments herein.

FIG. 4 illustrates a snippet 400 of a skeletal driver code for an ethernet controller device according to some embodiments herein. The HSI execution specification interpreter module 204 pre-loads an intermediate representation (IR) for one or more sequences that need to be interpreted for a skeletal driver Application Programming interface (API). When the skeletal driver API is called, the skeletal driver 206 ensures that the IR for the one or more sequences that may be interpreted during execution of the skeletal driver API are pre-loaded by calling hsi_load. In some embodiments, the hsi_load of the HSI execution specification interpreter module 204 identifies the one or more sequences required for the skeletal driver API and pre-loads the one or more sequences. The eth_start_xmit API invokes hsi_load at the appropriate place as shown in FIG. 4. The hsi_load in turn identifies that the sequences pre_transmit and tx_complete need to loaded for interpretation. The hsi_load identifies the sequences need for interpretation based on the map created by the HSI analyzer 202 as shown in FIG. 3.

In some embodiments, hsi_interpret is an entry point into the hardware-software interface (HSI) executable specification interpreter 204 for a driver code. In some embodiments, the entry-point function is invoked to interpret the sequence pre_transmit in the corresponding HSI IR thus causing the device transmit descriptors to be programmed appropriately. In some embodiments, an interpretation of an HSI sequence that involves performing one or more actions. In some embodiments, the one or more actions include (i) programming of underlying registers or device descriptors on the computing device 102, (ii) responding to device events or (iii) reading of device registers or the descriptors. At the end of interpretation, an execution control that comes back to the skeletal driver 206 and it continues its execution.

Figure 5:
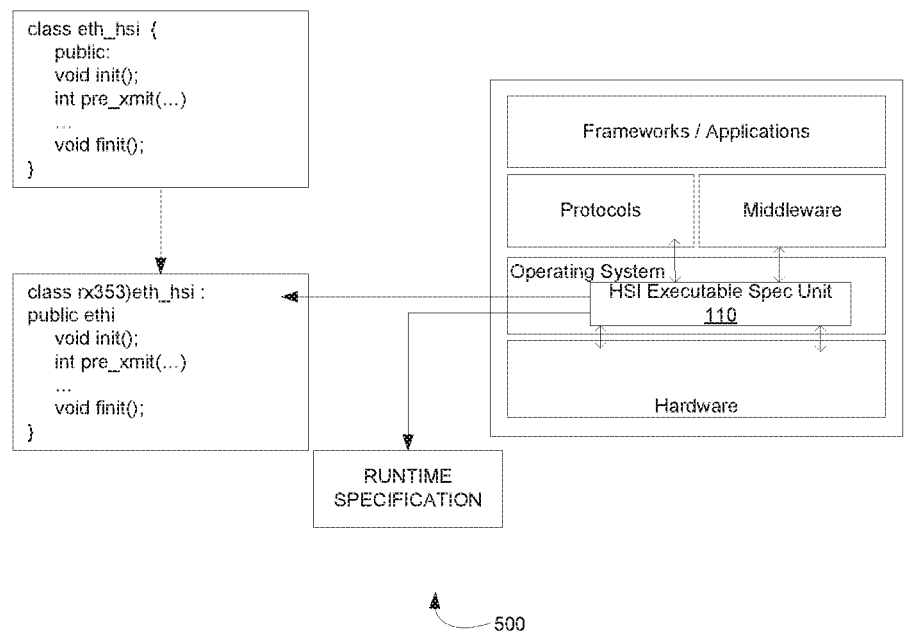
FIG. 5 illustrates specifying HSI using DSL embedding in C++ according to some embodiments herein.

FIG. 5 illustrates specifying HSI using DSL embedding in C++ according to an embodiment herein. In some embodiments, a user is provided with a C++ base class corresponding to devices in various device class categories such as ethernet, USB, storage etc. FIG. 5 depicts an HSI base class for ethernet controllers. In some embodiments, user derives from the HSI base class implementing all the HSI methods for the HSI corresponding to its ethernet device controller.

Figure 6:
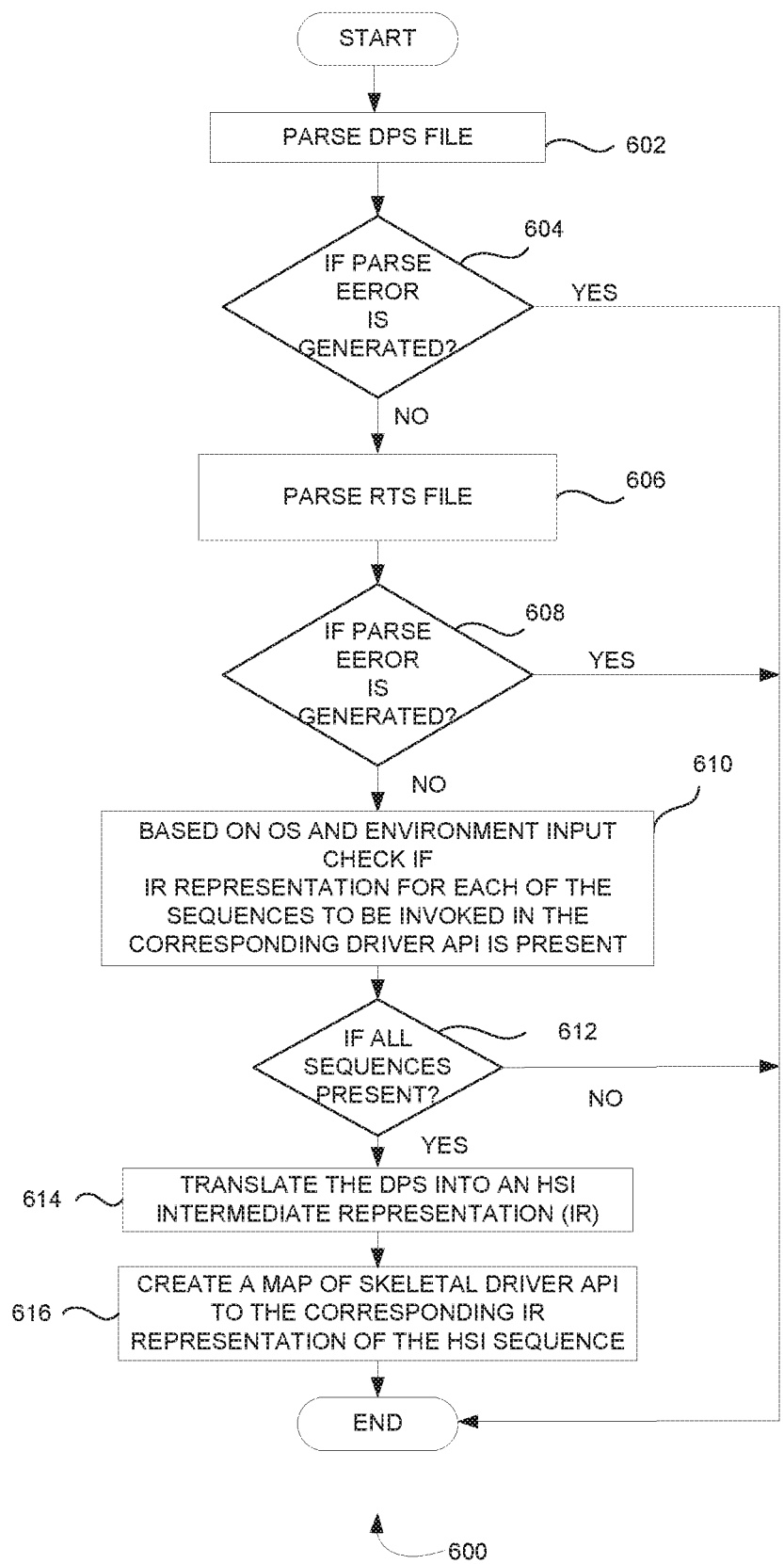
FIG. 6 is a flow diagram that illustrates a method of generating a map of a skeletal driver Application Programming interface (API) using a hardware-software interface (HSI) analyzer according to some embodiments herein.

FIG. 6 is a flow diagram that illustrates a method 600 of generating a map of a skeletal driver Application Programming interface (API) using a hardware-software interface (HSI) analyzer according to some embodiments herein. At step 602, the method 600 includes parsing device programming specification (DPS) into an intermediate form. At step 604, the method 600 includes checking if a parse error is generated in the device programming specification (DPS) if YES goes to end else goes to step 606. At step 606, the method 600 includes parsing a Runtime Specification (RTS) file. At step 608, the method 600 includes checking if the parse error is generated in the Runtime Specification (RTS) file if YES goes to end else goes to step 610. At step 610, the method 600 includes checking if an intermediate representation (IR) for each sequence to be invoked in at least one skeletal driver Application Programming Interface (API) is present in the device programming specification (DPS). At step 612, the method 600 includes checking if the DPS sequences for the corresponding skeletal driver API are present if YES goes to step 614 else goes to end. At step 614, the method 600 includes translating the one or more sequences of the device programming specification (DPS) into a hardware-software interface (HSI) intermediate representation (IR). At step 616, the method 600 includes creating the map of the skeletal driver API to the corresponding IR representation of the HSI sequence.

Figure 7:
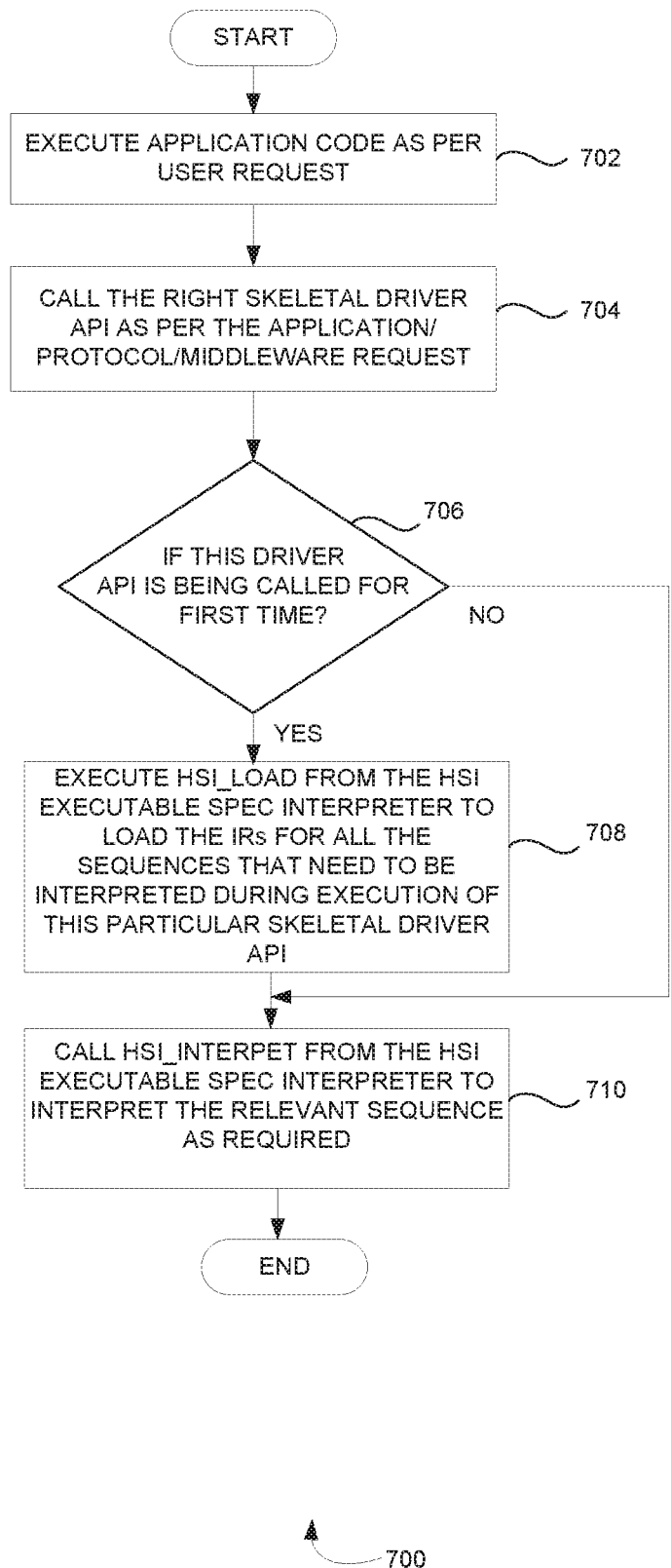
FIG. 7 is a flow diagram that illustrates a method of executing the skeletal driver Application Programming interface (API) according to some embodiments herein.

FIG. 7 is a flow diagram that illustrates a method 700 of executing a skeletal driver Application Programming interface (API) according to some embodiments herein. At step 702, the method 700 includes executing an application code based on a request from the user 116. At step 704, the method 700 includes calling the skeletal driver API to preload the one or more sequences that need to be interpreted for an execution of the corresponding skeletal driver API based on a request from an application, a protocol, or a middleware. At step 706, the method 700 includes checking if the skeletal driver Application Programming interface API is being called for the first time if yes goes to step 708 else goes to 710 since the IR would have been already loaded during the first call to the API and hence does not need to be reloaded. At step 708, the method 700 includes executing hsi_load from the HSI executable specification interpreter 204 to load the IRs all the sequences that need to be interpreted during execution of the corresponding skeletal driver API. At step 710, the method 700 includes calling hsi_interpet from the HSI executable spec interpreter to interpret a relevant sequence that is required by the skeletal driver API.

Figure 8:
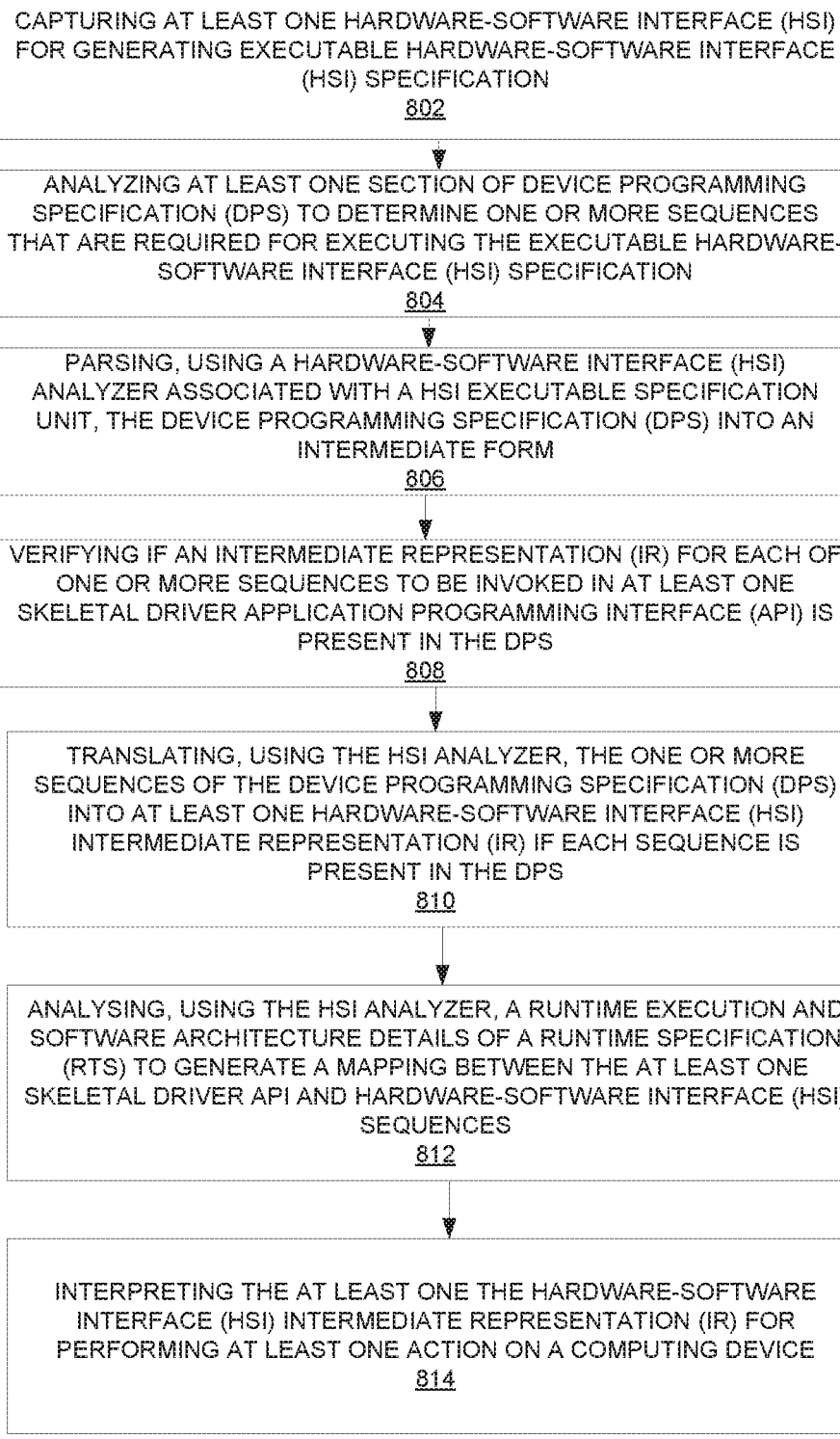
FIG. 8 is a flow diagram that illustrates a method for operating a hardware-software interface (HSI) executable specification unit by means of an executable hardware-software interface (HSI) specification for a computing device according to some embodiments herein.

FIG. 8 is a flow diagram that illustrates a method 800 for operating the hardware-software interface (HSI) executable specification unit 110 by means of an executable hardware-software interface (HSI) specification for the computing device 102 according to some embodiments herein. At step 802, the method 800 includes capturing a hardware-software interface (HSI) for generating the executable hardware-software interface (HSI) specification. At step 804, the method 800 includes analyzing at least one section of the device programming specification (DPS) to determine one or more sequences that are required for executing the executable hardware-software interface (HSI) specification. At step 806, the method 800 includes parsing, using the hardware-software interface (HSI) analyzer 202 associated with the HSI executable specification unit 110, the device programming specification (DPS) into an intermediate form. At step 808, the method 800 includes verifying if an intermediate representation (IR) for each of the one or more sequences to be invoked in a skeletal driver Application Programming Interface (API) is present in the device programming specification (DPS). At step 810, the method 800 includes translating, using the HSI analyser 202, the one or more sequences of the device programming specification (DPS) into at least one hardware-software interface (HSI) intermediate representation (IR) if each sequence is present in the device programming specification (DPS). At step 812, the method 800 includes analysing, using the HSI analyser 202, a runtime execution and software architecture details of a runtime specification (RTS) to generate a mapping between the skeletal driver Application Programming Interface (API) and hardware-software interface (HSI) sequences. At step 814, the method 800 includes interpreting the at least one hardware-software interface (HSI) intermediate representation (IR) for performing at least one action on the computing device 102. In some embodiments, the at least one hardware-software interface (HSI) intermediate representation (IR) is interpreted for performing the at least one action on the computing device to execute the at least one skeletal driver API based on a request that is received from at least one of (i) an application, (ii) a protocol or (iii) a middleware.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
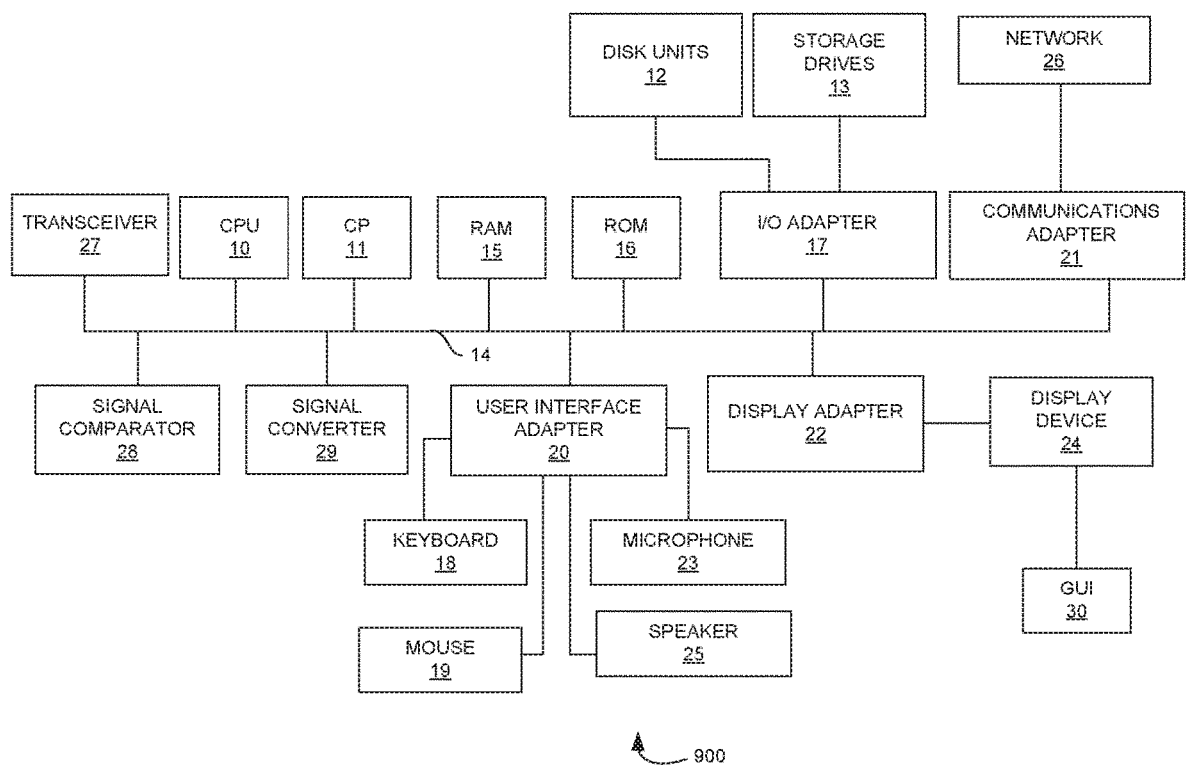
FIG. 9 is a block diagram of a schematic diagram of a device used in accordance with embodiments herein.

A representative hardware environment for practicing the embodiments herein is depicted in FIG. 9, with reference to FIGS. 1 through 8. This schematic drawing illustrates a hardware configuration of the computing device 102 in accordance with the embodiments herein. The computing device 102 includes at least one processing device 10 and a cryptographic processor 11. The special-purpose CPU 10 and the cryptographic processor (CP) 11 may be interconnected via system bus 14 to various devices such as a random-access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The computing device 102 can read the inventive instructions on the program storage devices and follow these instructions to execute the methodology of the embodiments herein. The computing device 102 further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for operating a hardware-software interface (HSI) executable specification unit by means of an executable hardware-software interface (HSI) specification for a computing device, wherein the hardware-software interface (HSI) executable specification unit comprises a hardware-software interface (HSI) analyzer, at least one skeletal driver and a hardware-software interface (HSI) executable specification interpreter, the method comprising:

generating the executable hardware-software interface (HSI) specification by capturing at least one hardware-software interface (HSI), wherein the executable hardware-software interface (HSI) specification is a form of a Device Programming Specification (DPS);

determining a plurality of sequences of the device programming specification (DPS) that are required for executing the executable hardware-software interface (HSI) specification by analyzing at least one section of the device programming specification (DPS);

parsing, using the hardware-software interface (HSI) analyzer, the device programming specification (DPS) into an intermediate form;

verifying if the plurality of sequences of the device programming specification (DPS) for at least one skeletal driver Application Programming Interface (API) is present in the device programming specification (DPS);

translating, using the HSI analyzer, the plurality of sequences of the device programming specification (DPS) into at least one hardware-software interface (HSI) intermediate representation (IR) if the plurality of the sequences are present in the device programming specification (DPS);

generating, using the HSI analyzer, a mapping between the at least one skeletal driver API and hardware-software interface (HSI) sequences by analyzing a runtime execution and software architecture details of a runtime specification (RTS); and interpreting the at least one hardware-software interface (HSI) intermediate representation (IR) for performing at least one action on the computing device.

2. The method of claim 1, wherein the at least one hardware-software interface (HSI) intermediate representation (IR) is interpreted for performing the at least one action on the computing device to execute the at least one skeletal driver API based on a request that is received from at least one of (i) an application, (ii) a protocol or (iii) a middleware.

3. The method of claim 1, further comprising parsing, using the hardware-software interface (HSI) analyzer, a Runtime Specification (RTS) if a parse error is not generated in the device programming specification (DPS).

4. The method of claim 1, wherein the intermediate representation (IR) for each of the plurality of sequences to be invoked in the at least one skeletal driver API is determined based on an operating system and an environment input.

5. The method of claim 1, wherein the mapping enables the HSI executable specification interpreter to (i) identify the hardware-software interface (HSI) sequences to be loaded for an interpretation and (ii) pre-load an intermediate representation (IR) for the corresponding HSI sequences for the interpretation when the at least one skeletal driver API of the computing device is executed.

6. The method of claim 4, further comprising
executing a hardware-software interface (HSI) load function from the hardware-software interface (HSI) executable specification interpreter to load intermediate representations (IRs) for the plurality of sequences that need to be interpreted during an execution of the at least one skeletal driver API; and calling a hardware-software interface (HSI) interpret function from the HSI executable specification interpreter to interpret a corresponding sequence that is required by the at least one skeletal driver API.

7. The method of claim 6, wherein the at least one skeletal driver calls the hardware-software interface (HSI) interpret function along with a name of the corresponding sequence as argument to inform the HSI interpreter about the corresponding sequence that is to be interpreted.

8. The method of claim 1, further comprising invoking the HSI executable specification interpreter at an appropriate point and specifying a device programming specification (DPS) sequence that needs to be interpreted during execution of the at least one skeletal driver API.

9. The method of claim 1, further comprising interpreting, using the HSI executable specification interpreter, the DPS sequence using the corresponding IR that was created previously by the HSI analyzer.

10. The method of claim 1, wherein the at least one hardware-software interface (HSI) intermediate representation (IR) is at least one of (i) a byte code and (ii) an Abstract Syntax Tree (AST).

11. A system for operating a hardware-software interface (HSI) executable specification unit by means of an executable hardware-software interface (HSI) specification for a computing device, wherein the system comprising:

one or more processors; and one or more non-transitory computer-readable mediums storing one or more sequences of instructions, which when executed by the one or more processors, wherein the hardware-software interface (HSI) executable specification unit comprises a hardware-software interface (HSI) analyzer, at least one skeletal driver and a hardware-software interface (HSI) executable specification interpreter, wherein the one or more one or more processors cause:

generating the executable hardware-software interface (HSI) specification by capturing at least one hardware-software interface (HSI), wherein the executable hardware-software interface (HSI) specification is a form of a Device Programming Specification (DPS);

determining a plurality of sequences of the device programming specification (DPS) that are required for executing the executable hardware-software interface (HSI) specification by analyzing at least one section of the device programming specification (DPS);

parsing, using the hardware-software interface (HSI) analyzer, the device programming specification (DPS) into an intermediate form;

verifying if the plurality of sequences of the device programming specification (DPS) for at least one skeletal driver Application Programming Interface (API) is present in the device programming specification (DPS);

translating, using the HSI analyzer, the plurality of sequences of the device programming specification (DPS) into at least one hardware-software interface (HSI) intermediate representation (IR) if the plurality of the sequences are present in the device programming specification (DPS);

generating, using the HSI analyzer, a mapping between the at least one skeletal driver API and hardware-software interface (HSI) sequences by analyzing a runtime execution and software architecture details of a runtime specification (RTS); and interpreting the at least one hardware-software interface (HSI) intermediate representation (IR) for performing at least one action on the computing device.

12. The system of claim 11, wherein the at least one hardware-software interface (HSI) intermediate representation (IR) is interpreted for performing the at least one action on the computing device to execute the at least one skeletal driver API based on a request that is received from at least one of (i) an application, (ii) a protocol or (iii) a middleware.

13. The system of claim 11, wherein the one or more processors causes parsing, using the hardware-software interface (HSI) analyzer, a Runtime Specification (RTS) file if a parse error is not generated in the device programming specification (DPS).

14. The system of claim 11, wherein the intermediate representation (IR) for each of the plurality of sequences to be invoked in the at least one skeletal driver API is determined based on an operating system and an environment input.

15. The system of claim 11, wherein the mapping enables the HSI executable specification interpreter to (i) identify the hardware-software interface (HSI) sequences to be loaded for an interpretation and (ii) pre-load an intermediate representation (IR) for the corresponding HSI sequences for the interpretation when the at least one skeletal driver Application Programming Interface (API) of the computing device is executed.

16. The system of claim 15, wherein the one or more processors causes
- executing a hardware-software interface (HSI) load function from the hardware-software interface (HSI) executable specification interpreter to load intermediate representations (IRs) for the plurality of sequences that need to be interpreted during the execution of the at least one skeletal driver API; and
- calling a hardware-software interface (HSI) interpret function from the HSI executable specification interpreter to interpret a corresponding sequence that is required by the at least one skeletal driver API.

17. The method of claim 11, wherein the at least one skeletal driver calls the hardware-software interface (HSI) interpret function along with a name of the corresponding sequence as argument to inform the HSI interpreter about the corresponding sequence that is to be interpreted.

18. The system of claim 11, wherein the one or more processors causes invoking the HSI executable specification interpreter at an appropriate point and specifying a device programming specification (DPS) sequence that needs to be interpreted during execution of the at least one skeletal driver API.

19. The system of claim 11, wherein the one or more processors causes interpreting, using the HSI executable specification interpreter, the DPS sequence using the corresponding IR that was created previously by the HSI analyzer.

* * * * *